April 21, 1959 H. T. MORTIMER 2,883,604

MAGNETIC FREQUENCY CHANGER

Filed Feb. 8, 1957 3 Sheets-Sheet 1

INVENTOR
HARRY T. MORTIMER

BY W. R. Mattox
Richard C. Reed
ATTORNEYS

April 21, 1959 H. T. MORTIMER 2,883,604
MAGNETIC FREQUENCY CHANGER
Filed Feb. 8, 1957 3 Sheets-Sheet 2

INVENTOR
HARRY T. MORTIMER

BY W R Mattox
Richard C Reed
ATTORNEYS

INVENTOR
HARRY T. MORTIMER
BY W.R. Maltby
Richard C. Reed
ATTORNEYS 2,883,604

MAGNETIC FREQUENCY CHANGER

Harry T. Mortimer, Los Angeles, Calif.

Application February 8, 1957, Serial No. 639,127
17 Claims. (Cl. 321—68)
(Granted under Title 35, U.S. Code (1952), sec. 266)

The invention described herein may be manufactured and used by or for the Government of the United States of America for governmental purposes without the payment of any royalties thereon or therefor.

The present invention relates to magnetic frequency changers and more particularly to magnetic frequency changers utilizing grain oriented magnetic materials.

Magnetic frequency changers are known in which an input winding produces flux in two intersecting magnetic cores which are perpendicular to each other but which make an angle of approximately 45° with the input winding. An output winding is disposed on the cores at an angle of approximately 45° to each of the cores and substantially perpendicular to the input winding. A biasing magnetomotive force is provided for initially biasing the intersecting cores to the knee of the magnetization curve and is in one direction when the device is employed as a frequency multiplier and is in the other direction when the device is employed as a frequency divider. The so-called McCreary cross-valve as exemplified by Patent No. 2,445,857 is typical of this general type of a device. The flux set up by the magnetomotive force in the different windings makes an angle of approximately 45° with the direction of the intersecting cores and the cores of the device are constructed of non-grain oriented material.

The present invention provides a frequency changer employing a core of grain oriented material with input and output windings placed upon the core parallel and perpendicular to the direction of grain orientation, thus producing flux parallel and perpendicular to the direction of the grain. In the frequency multiplier, the input winding is placed upon the core perpendicular to the direction of grain orientation and the output winding is positioned parallel thereto, while in the frequency divider the input winding is placed parallel to the direction of grain orientation and the output winding is positioned perpendicular thereto.

When the device is operated as a frequency multiplier, a core of grain oriented magnetic material is provided with a plurality of apertures aligned parallel to and perpendicular to the direction of the grain orientation of the material. An input winding is placed on the core perpendicular to the direction of the grain so that the magnetic flux produced by a magnetomotive force flowing in the winding will be parallel to the direction of the grain. A biasing magnetic field is provided at an angle to the direction of the grain, preferably perpendicular thereto and of sufficient magnitude to drive the core to saturation upon the application of a periodically varying magnetomotive force to the input winding. An output winding is placed on the core parallel to the grain orientation and perpendicular to the input winding. When a signal of given frequency is applied to the input winding, an output signal of double the input frequency will be induced in the output winding.

When the device is used as a frequency divider, the input winding is placed on the core parallel to the direction of grain orientation of the material while the output winding is placed on the core perpendicular thereto. As in the case of the frequency divider, a biasing magnetic field may be provided at an angle to the direction of the grain preferably perpendicular thereto and of sufficient magnitude to drive the core to saturation upon the application of a varying magnetomotive force to the input winding. The device, when operated as a frequency divider produces a unique non-linear characteristic when the sub-harmonic output voltage is plotted as a function of the input voltage. Over a certain range of input voltage the curve is very steep, so that for a small change in input voltage a very large change in the sub-harmonic output occurs. Such a characteristic renders the device very useful as a magnetic switch and as a sensitive controlling device.

An object of the present invention is the provision of a magnetic frequency changer utilizing grain-oriented magnetic materials.

Another object is to provide a magnetic frequency changer utilizing grain-oriented magnetic materials in which the flux produced by applied magnetomotive forces is either parallel or perpendicular to the direction of grain orientation of such material.

A further object of the invention is the provision of a self-starting frequency divider utilizing grain oriented materials in which a large change in output voltage occurs with a small change in input voltage over a particular range of input voltages.

Still another object of the invention is the provision of a sensitive control apparatus utilizing a magnetic frequency divider.

A further object of the invention is the provision of a magnetic frequency multiplier utilizing grain oriented magnetic materials.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
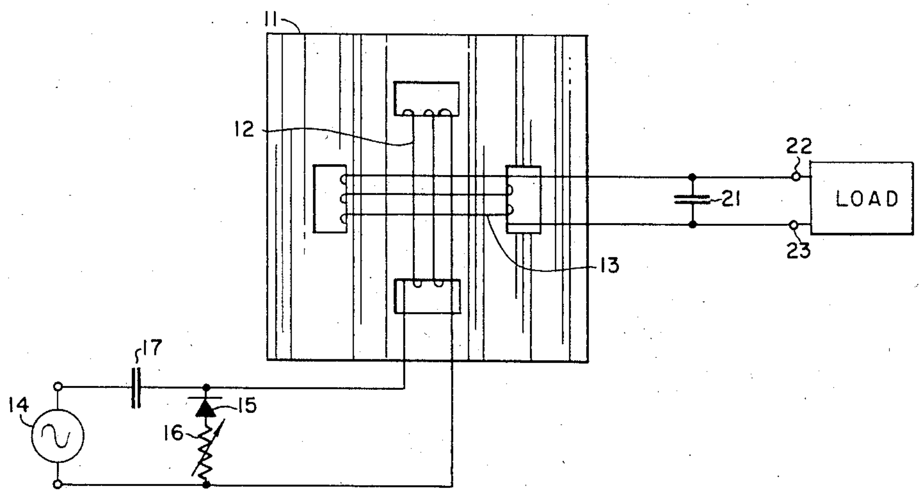
Fig. 1 is a schematic representation of one embodiment of the self-starting magnetic frequency divider of the invention.

Referring now to the drawings in which like reference characters designate like or corresponding parts throughout the several views, there is shown in Fig. 1, which illustrates one embodiment of the frequency divider of the present invention, a metallic core 11 made of grain oriented magnetic material such as Hypersil, Trancor, 3*x* etc., having an input winding 12 placed thereon parallel to the direction of grain orientation and an output winding 13 placed thereon perpendicular to the direction of grain orientation. A source of alternating voltage 14 is applied to the input winding 12 which has connected across it a rectifier 15, and a variable resistor 16; this combination causes an alternating current superimposed on a direct current to flow through the winding 12. A condenser 17 is provided to block the direct current from the source 14. It is evident that the amount of direct current which flows in the winding 12 can be controlled by the variable resistor 16. A capacitor 21 is placed across the output terminals 22 and 23 to provide for self-starting of the frequency divider.

Figure 2:
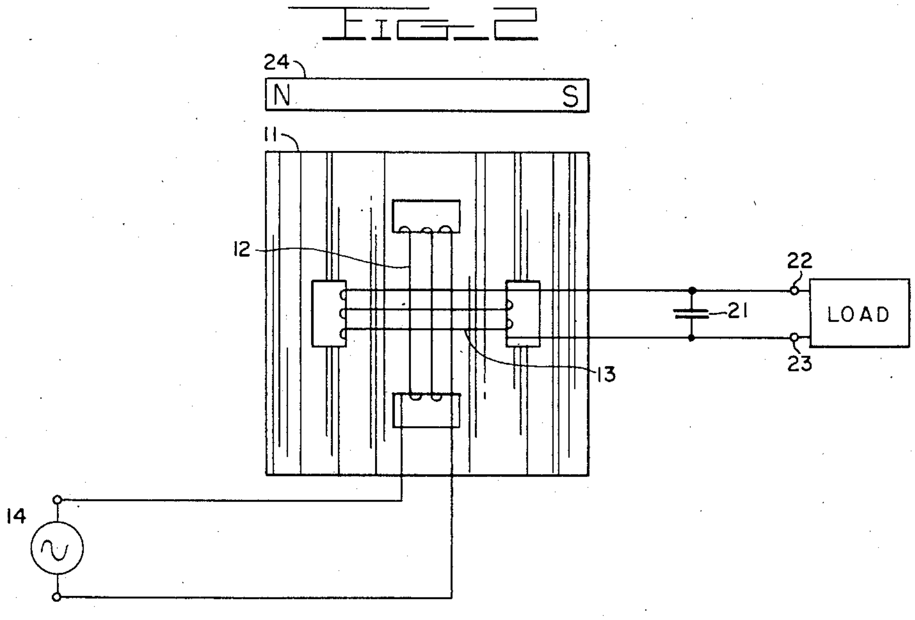
Fig. 2 is another embodiment of the self-starting magnetic frequency divider utilizing a different means for supplying a biasing magnetic field.

In Fig. 2 an external magnetic field represented by a permanent magnet 24, but which could be any other form of device to produce a magnetic field, such as an electromagnet, is used to supply the magnetic bias supplied by the direct current resulting from the rectifier 15 and the resistor 16 in Fig. 1. This external field is applied at an angle to the direction of grain orientation, preferably perpendicular thereto. Except for the absence of the rectifier 15, variable resistor 16, condenser 17 and the addition of the external field 24 the devices of Figs. 1 and 2 are the same.

Figure 3:
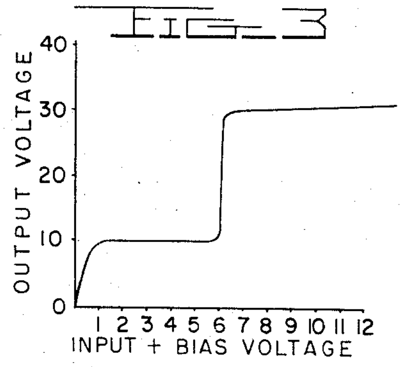
Fig. 3 shows a typical curve for the magnetic frequency divider in which the amplitude of the output voltage is plotted as a function of the amplitude of the input and biasing voltages.

When an alternating voltage from the source 14 is applied to the input winding 12, a sub-harmonic of one-half the frequency of the input voltage appears at the output terminals 22 and 23. Referring now to Fig. 3 which is a plot of the output voltage as a function of the input alternating voltage plus a direct voltage produced in the input winding as a result of the action of the rectifier 15 and variable resistance 16, or the alternating input voltage plus the external magnetic field supplied by a source such as permanent magnet 24 as shown in Fig. 2, it can be seen that the curve has a very steep portion in one particular region. At this particular point on the curve a very small increase in the amplitude of the alternating input signal or the biasing voltage will produce a very large increase in the amplitude of the output voltage.

Figure 4:
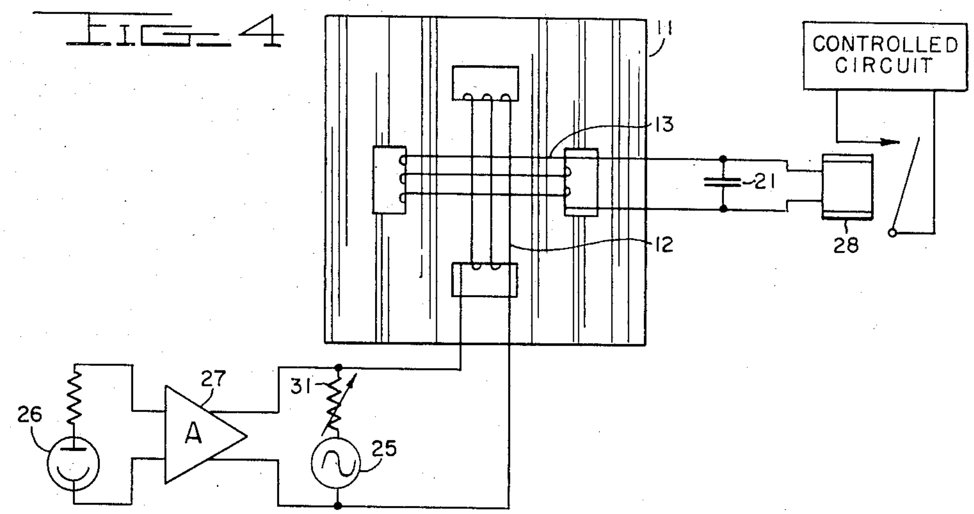
Fig. 4 is a schematic representation of an automatic control system utilizing the frequency divider of Fig. 1.

This particular characteristic can be employed to produce a magnetic switch or controlling device as exemplified in Fig. 4. In this embodiment an alternating current generator 25 is used to produce an alternating current input which brings the input voltage very near that amplitude where the characteristic curve shown in Fig. 3 is very steep. A photoelectric cell 26 is employed to sense the intensity of light given off in some industrial process, such as smelting of metal ores in which the intensity of light given off is proportional to the temperature. As the temperature of the metal rises the current developed in the photo cell 26 increases and this current is amplified by a high gain amplifier 27 before being fed to the winding 12. At a certain point when the voltage developed in the input winding 12 is sufficient, the output voltage in the output winding 13 will jump from a comparatively low value to a comparatively high value. A relay 28 is provided across the output 13 which will close when the output voltage jumps from the lower value to the higher value shown on the curve of Fig. 3. The closing of the relay can in turn control a fuel supply to the source of heat for a furnace associated with the smelting process, and turn the furnace off when the relay is closed. As the temperature of the metal drops the light falling on the photo cell will decrease, the current through the coil 12 and the voltage appearing across it will decrease, and when it decreases an amount sufficient to bring the amplitude of the input voltage down below the lower knee of the curve, the output voltage will suddenly drop from the higher value shown to the lower value shown on the curve in Fig. 3, the relay will be de-energized and the fuel will once more be supplied to the furnace. A variable resistor 31 can be placed in series with the generator 25 to control the amount of output voltage from the generator, thus providing a means to vary the temperature at which he relay 28 will open and close.

Figure 5:
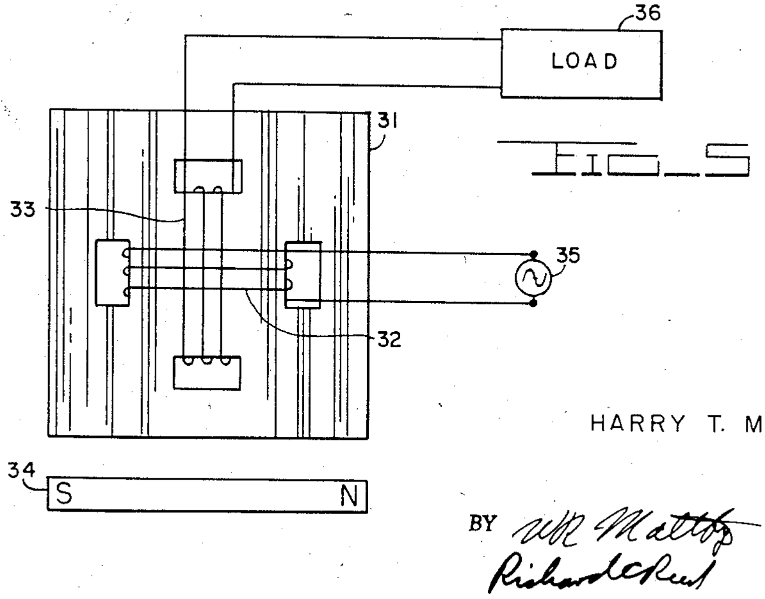
Fig. 5 is a schematic representation of the frequency multiplier of the present invention utilizing an external magnetic field as a biasing means.

Referring now to Fig. 5 there is shown an embodiment of the frequency multiplier of the present invention which utilizes the same type of grain oriented material in the core 31 as was employed in the frequency divider. However, in the frequency multiplier the input winding 32 is placed on the core perpendicular to the direction of the grain orientation and the output winding 33 is placed parallel to the direction of grain orientation. An external magnetic field represented by a permanent magnet 34 is applied at an angle to the direction of the grain orientation, preferably perpendicular thereto as is the case in the frequency divider of Fig. 2. When an alternating signal of a given frequency is applied to the winding 32 by means of a signal source 35, an output voltage will be developed in the winding 33 and delivered to the load 36 which is the second harmonic of the input signal.

Figure 6:
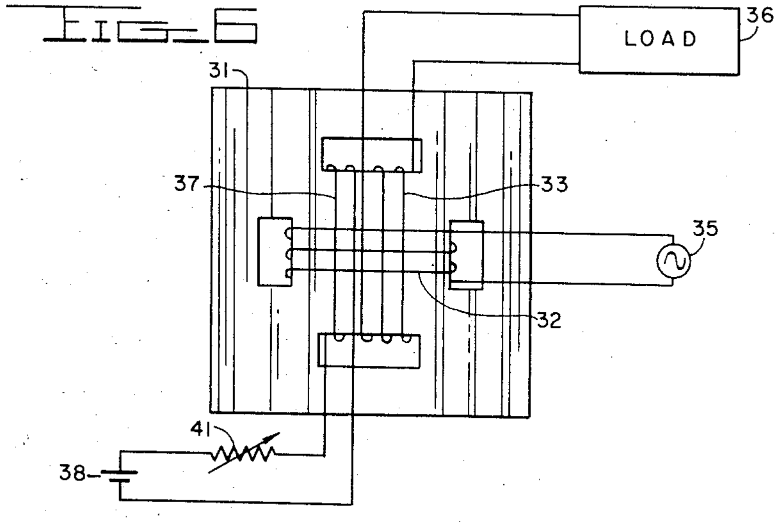
Fig. 6 is another embodiment of the frequency multiplier in which an extra winding and source of electrical energy is employed to provide the magnetic bias.

Another embodiment of the frequency multiplier is shown in Fig. 6, which is the same as that shown in Fig. 5 with the exception of the means for developing the magnetic field perpendicular to the direction of grain orientation. An extra winding 37 wound parallel to the direction of grain orientation is connected to a source of current 38 which may be controlled by a variable resistance 41. This provides a magnetic field perpendicular to the direction of the grain of the core 31, however in this embodiment the magnetic field applied may be varied by means of the resistor 41. As in the embodiment of Fig. 5, a second harmonic output voltage is developed in the winding 33 and delivered to the load 36.

Figure 7:
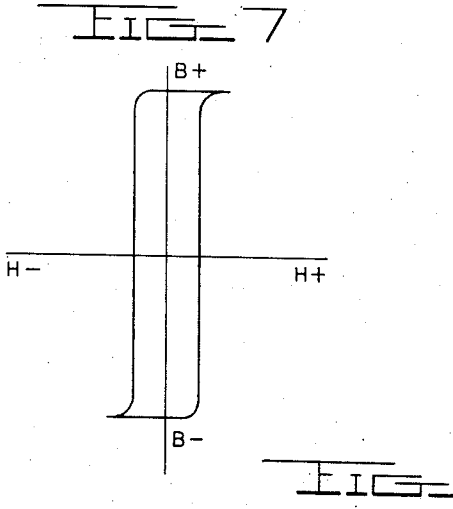
Fig. 7 is a hysteresis loop of the grain oriented material in the direction of grain orientation.
Figure 8:
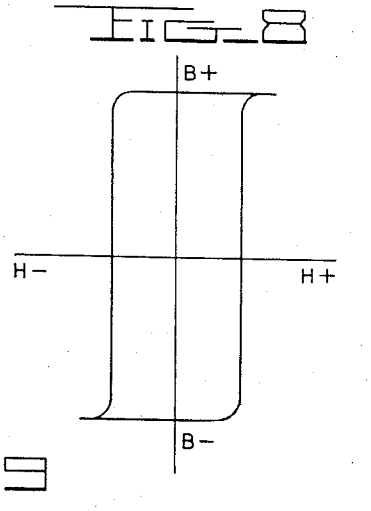
Fig. 8 is a hysteresis loop of the grain oriented material in a direction perpendicular to the direction of grain orientation.

As pointed out previously the material used for the cores 11 and 31 is a grain oriented material such as Hypersil, Trancor, 3*x*, etc., and is normally produced by a cold rolling process on silicon iron, generally with a silicon content up to 3.5%. This process provides a magnetically anisotropic sheet in which the crystalline structure seems to take up a preferred orientation and the finished sheet has directional magnetic properties similar to those of a single crystal. The direction of highest permeability and lowest hysteresis loss is in the direction of rolling as indicated by the hysteresis loop of Fig. 7 which shows the B–H characteristics of the material in the direction of rolling or grain orientation contrasted with the permeability and hysteresis loss in the material perpendicular to the direction of the grain orientation as shown in Fig. 8.

Figure 9:
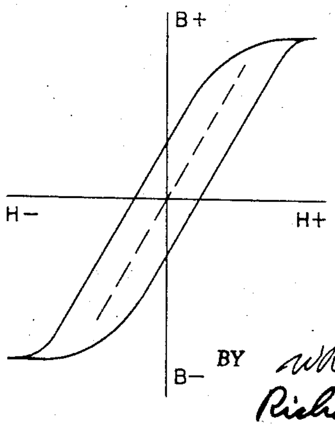
Fig. 9 depicts the hysteresis loop of the material under the influence of a unidirectional magnetic field applied at an angle to the direction of grain orientation.

It is believed that the theory of operation of the device is as follows, however it is not intended that the invention in any way be restricted by the explanation. When the device is operated as a frequency multiplier in the absence of a biasing magnetic field, the time varying magnetic field created by the magnetomotive force in the input winding 32 is parallel to the direction of winding of the output winding 33, hence the output winding 33 does not cut any lines of flux and no output results. Similarly, if a magnetic field were applied parallel to the direction of the grain orientation, and perpendicular to the direction of the input winding, the device will operate higher up or lower down on the hysteresis loop of Fig. 7, but no output will result since the time varying magnetic field is still parallel to the direction of the output winding 33. However, when a magnetic field represented by the permanent magnet 34 in Fig. 5 is applied at an angle to the direction of grain orientation, the material operates about a non-linear hysteresis loop as shown in Fig. 9 and flux harmonics of the input voltage, predominantly the second harmonic, now coupled with the winding 33, and an output voltage which is predominantly the second harmonic of the input voltage is produced in the winding 33. The input frequency does not appear as it is still decoupled from the output winding 33.

When the device is operated as a frequency divider, the input winding 12 produces a time varying magnetic field perpendicular to the direction of the grain orientation of the material but parallel to the winding 13. As shown by Fig. 3 an output will result in the absence of an external magnetic bias, since the flux of the winding 12 is reoriented by the magnetic characteristics of the core 11 so as to couple with the output winding 13. When an additional magnetic field is applied in the form of a direct current through the input winding 12 or an external magnetic field represented by the magnet 24 of magnitude to bias the core to the knee of the hysteresis curve shown in Fig. 9, the output voltage will jump from a relatively low value to a relatively high value. Effective action of the core in producing sub-harmonics of the input voltage requires that the effective flux which links the output winding 13 must be one-half the frequency of the input voltage fed to the input winding 12.

It is readily apparent from an inspection of Figs. 1, 2, 5 and 6 that the frequency multiplier can be converted to a frequency divider by merely using the input winding as the output winding and the output winding as the input winding, and the frequency divider can be converted to a frequency doubler by an opposite shift in the windings.

The present invention thus provides a very simple rugged magnetic frequency changer utilizing grain-oriented magnetic materials in which the flux produced by the applied time-varying magnetomotive force is either parallel or perpendicular to the direction of grain orientation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A magnetic coupling device comprising, a core of grain-oriented magnetic material, a first winding positioned on said core wound around an axis which is perpendicular to the direction of grain orientation, and a second winding positioned on said core wound around an axis which is parallel to the direction of grain orientation.

2. A magnetic coupling device comprising, a core of grain-oriented magnetic material, a first winding having magnetic flux linkage with said core which predominates in a direction parallel to the direction of grain orientation, a second winding having magnetic flux linkage with said core which predominates in a direction perpendicular to the direction of grain orientation of said core, and a source of input signal including a variational component connected to one of said windings.

3. A magnetic frequency changer comprising, a core of grain-oriented magnetic material, a first winding having magnetic flux linkage with said core which predominates in a direction parallel to the direction of grain orientation, a second winding having magnetic flux linkage with said core which predominates in a direction perpendicular to the direction of grain orientation of said core, a source of alternating current connected to one of said windings, a load connected to the other of said windings and means adjacent said core for producing a biasing flux in said core at an angle to the direction of grain orientation of said material.

4. A magnetic coupling device comprising, a core of grain-oriented magnetic material, a first winding positioned on said core wound around an axis perpendicular to the direction of grain orientation, a second winding positioned on said core wound around an axis parallel to the direction of grain orientation, a source of alternating current connected to one of said windings, and a load circuit connected to the other of said windings.

5. A magnetic frequency changer comprising, a core of magnetically anisotropic material having a determined direction of grain orientation and having two pairs of apertures therein, a first winding wound through one pair of apertures around an axis parallel to the direction of grain orientation, a second winding wound through the other pair of apertures around an axis perpendicular to the direction of grain orientation, a source of alternating current connected to one of said windings, a load circuit connected to the other of said windings and means adjacent said core for producing a magnetic field in a direction perpendicular to the direction of grain orientation of said magnetically anisotropic material.

6. In a magnetic frequency changer, a core of magnetically anisotropic material having a determined direction of grain orientation, means adjacent said core for applying a time varying magnetic field to said core substantially perpendicular to the direction of grain orientation, an output winding positioned on said core wound around an axis substantially parallel to the direction of grain orientation, means adjacent said core for applying a magnetic field to said core at an angle to the direction of grain orientation and a load circuit including a capacitor connected across said output winding.

7. In a magnetic frequency changer, a core of magnetically anisotropic material having a determined direction of grain orientation, means adjacent said core for applying a time varying magnetic field to said core substantially perpendicular to the direction of grain orientation, and an output winding positioned on said core wound about an axis substantially parallel to the direction of grain orientation.

8. A magnetic frequency changer comprising, a core of magnetically anisotropic material having a determined direction of grain orientation, input means adjacent said core for applying a time varying magnetic field to said core substantially parallel to the direction of grain orientation, biasing means adjacent said core for applying a constant magnetic field substantially perpendicular to the direction of grain orientation, and an output winding positioned on said core wound around an axis substantially perpendicular to the direction of grain orientation.

9. A magnetic frequency changer comprising, a core of magnetically anisotropic material having a determined direction of grain orientation, input means adjacent said core for applying a time varying magnetic field to said core substantially parallel to the direction of grain orientation, biasing means adjacent said core for applying a steady strength magnetic field to said core at an angle to the direction of grain orientation, and output means magnetically linked to said core by flux components which are normal to said direction of grain orientation within said core for developing a harmonic frequency voltage of the time varying magnetic field.

10. A magnetic frequency changer comprising, a core of magnetically anisotropic material having a determined direction of grain orientation, input means adjacent said core for applying a time varying magnetic field to said core substantially parallel to the direction of grain orientation, biasing means adjacent said core for applying a steady strength magnetic field to said core at an angle to the direction of grain orientation, an output winding positioned on said core wound around an axis substantially perpendicular to the direction of grain orientation and a load circuit connected across said output winding.

11. A control device for controlling a first source of energy in response to a variation in the intensity of a second source of energy which is a function of said first source of energy comprising, a core of magnetically anisotropic material having a determined direction of grain orientation, input means adjacent said core for applying a periodic, time varying magnetic field to said core substantially perpendicular to the direction of grain orientation, biasing means adjacent said core for producing and applying to said core a magnetic field the magnitude of which is dependent upon the intensity of said second source of energy, an output winding positioned on said core wound around an axis substantially parallel to the direction of grain orientation and switch means connected to the output winding for controlling said first source of energy.

12. A magnetic frequency changer comprising, a core of magnetically anisotropic material having a determined direction of grain orientation, an input winding positioned on said core wound around an axis substantially parallel to the direction of grain orientation, a source of alternating current connected to said input winding, biasing means adjacent said core for applying a magnetic field to said core substantially perpendicular to the direction of grain orientation, an output winding positioned on said core wound around an axis substantially perpendicular to the direction of grain orientation and a load circuit connected to said output winding.

13. The magnetic frequency changer of claim 12 in which the means for applying a magnetic field to said core substantially perpendicular to the direction of grain orientation comprises a winding positioned on said core wound around an axis substantially perpendicular to the direction of grain orientation and a unidirectional current source connected to said winding.

14. The magnetic frequency changer of claim 12 in which the means for applying a magnetic field to said core substantially perpendicular to the direction of grain orientation comprises a magnet.

15. A magnetic frequency changer comprising, a core of magnetically anisotropic material having a determined direction of grain orientation, an input winding positioned on said core wound around an axis substantially perpendicular to the direction of grain orientation, a source of alternating current connected to said input winding, biasing means adjacent said core for applying a magnetic field to said core substantially perpendicular to the direction of grain orientation, an output winding positioned on said core wound around an axis substantially parallel to the direction of grain orientation and a load circuit connected to said output winding.

16. The magnetic frequency changer of claim 15 in which the means for applying a magnetic field to said core substantially perpendicular to the direction of grain orientation comprises a rectifier and a variable resistor connected in series across said input winding.

17. The magnetic frequency changer of claim 15 in which the means for applying a magnetic field to said core substantially perpendicular to the direction of grain orientation comprises a magnet.

References Cited in the file of this patent

UNITED STATES PATENTS

| | | |
|---|---|---|
| 1,976,461 | Prince | Oct. 9, 1934 |
| 2,461,992 | McCreary | Feb. 15, 1949 |
| 2,567,116 | McCreary | Sept. 4, 1951 |
| 2,602,153 | McCreary | July 1, 1952 |

OTHER REFERENCES

"Oriented Crystals" (Morrill), General Electric Review, August 1950, pages 16–21.